United States Patent
Bae et al.

(10) Patent No.: US 11,106,307 B2
(45) Date of Patent: Aug. 31, 2021

(54) METHOD FOR LOW POWER DRIVING OF DISPLAY AND ELECTRONIC DEVICE FOR PERFORMING SAME

(71) Applicant: Samsung Electronics Co., Ltd., Suwon-si (KR)

(72) Inventors: Jong Kon Bae, Seoul (KR); Han Yu Ool Kim, Seoul (KR); Matheus Farias Miranda, Suwon-si (KR); Yun Pyo Hong, Seoul (KR); Ha Young Kim, Seoul (KR); Ji Eun Yang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 78 days.

(21) Appl. No.: 16/497,688

(22) PCT Filed: Mar. 27, 2018

(86) PCT No.: PCT/KR2018/003597
§ 371 (c)(1),
(2) Date: Sep. 25, 2019

(87) PCT Pub. No.: WO2018/182287
PCT Pub. Date: Oct. 4, 2018

(65) Prior Publication Data
US 2021/0109623 A1 Apr. 15, 2021

(30) Foreign Application Priority Data
Mar. 28, 2017 (KR) .................. 10-2017-0039621

(51) Int. Cl.
G06F 3/041 (2006.01)
G06F 1/3234 (2019.01)
G09G 3/20 (2006.01)

(52) U.S. Cl.
CPC .......... *G06F 3/0416* (2013.01); *G06F 1/3265* (2013.01); *G06F 3/0414* (2013.01);
(Continued)

(58) Field of Classification Search
CPC .. G06F 3/0416–041662; G06F 1/3265; G09G 2310/04; G09G 2330/023
See application file for complete search history.

(56) References Cited

U.S. PATENT DOCUMENTS 10,310,733 B2    6/2019  Kim et al.
2014/0368479 A1*  12/2014 Bae .......................... G09G 5/18
                                                       345/204
(Continued)

FOREIGN PATENT DOCUMENTS

KR    10-2014-105328 A1   9/2014
KR    10-2017-0008698 A    1/2017
(Continued)

OTHER PUBLICATIONS

Written opinion of the international searching authority for PCT/KR2018/003597, dated May 7, 2018.

*Primary Examiner* — Laurence J Lee
(74) *Attorney, Agent, or Firm* — Jefferson IP Law, LLP

(57) ABSTRACT

An electronic device includes a touch sensor; a touch sensor integrated circuit (IC) to detect a touch sensed by the touch sensor, a display panel, a host processor, and a display driving integrated circuit (IC) to drive the display panel such that an image received from a host processor is displayed on the display panel.

14 Claims, 10 Drawing Sheets

(52) U.S. Cl.
CPC ........... *G09G 3/20* (2013.01); *G09G 2310/04* (2013.01); *G09G 2320/103* (2013.01); *G09G 2330/023* (2013.01)

(56) References Cited

U.S. PATENT DOCUMENTS

| | | | |
|---|---|---|---|
| 2015/0042572 A1* | 2/2015 | Lombardi | G06F 3/01 345/173 |
| 2015/0103081 A1* | 4/2015 | Bae | G06T 1/20 345/501 |
| 2016/0004416 A1 | 1/2016 | Kim et al. | |
| 2018/0203500 A1 | 7/2018 | Kim et al. | |

FOREIGN PATENT DOCUMENTS

| | | |
|---|---|---|
| KR | 10-2017-0031333 A | 3/2017 |
| KR | 10-2018-0014644 A | 2/2018 |
| KR | 10-2018-0083599 A | 7/2018 |
| WO | 2017014475 A1 | 1/2017 |
| WO | 2017034219 A1 | 3/2017 |

\* cited by examiner

METHOD FOR LOW POWER DRIVING OF DISPLAY AND ELECTRONIC DEVICE FOR PERFORMING SAME

CROSS-REFERENCE TO RELATED APPLICATION(S)

This application is a U.S. National Stage application under 35 U.S.C. § 371 of an International application number PCT/KR2018/003597, filed on Mar. 27, 2018, which is based on and claimed priority of a Korean patent application number 10-10-2017-0039621, filed on Mar. 28, 2017, in the Korean Intellectual Property Office, the disclosure of which is incorporated by reference herein in its entirety.

BACKGROUND

1. Field

The present disclosure relates to a method for driving a display at low power and an electronic device performing the same.

2. Description of Related Art

With the developments of mobile communication technologies, an electronic device is easy to carry and is able to freely connect to wired/wireless networks. For example, portable electronic devices, such as a smartphone, a tablet personal computer (PC), and the like, are able to support various functions, such as Internet connection and multimedia content reproduction, in addition to a call function and a message transmitting/receiving function.

The display of the portable electronic device may be implemented in the form of a touch screen display including a touch sensor. The touch screen display may play a role as an input unit that receives a manipulation from a user, in addition to a role as a visual display unit.

The above information is presented as background information only to assist with an understanding of the disclosure. No determination has been made, and no assertion is made, as to whether any of the above might be applicable as prior art with regard to the disclosure.

SUMMARY

The electronic device may output, onto the touch screen display, informative information, such as a clock, a date, and/or notification, even when the electronic device operates in an inactive status (or referred to as a sleep status, a sleep mode, a low power mode). The electronic device may output informative information (see always on display (AOD) content) even in the inactive status for saving power consumption.

Aspects of the present disclosure are to address at least the above-mentioned problems and/or disadvantages and to provide at least the advantages described below. Accordingly, an aspect of the present disclosure is to provide a method for providing various pieces of AOD content based on the interaction (e.g., a touch input) with a user, when an electronic device operates in an inactive status (e.g., a sleep status), and an electronic device performing the same.

In accordance with an aspect of the present disclosure, an electronic device may include a touch sensor, a touch sensor integrated circuit (IC) which detects a touch through the touch sensor, a display panel, a host processor, and a display driving integrated circuit (IC) which drives the display panel such that an image received from the host processor is displayed on the display panel. The display driving IC may receive an image including a plurality of partial images from the host processor and may store the image in a graphic random access memory (GRAM), and the host processor may be driven to selectively output one of the plurality of partial images in a low power status, and to selectively output, onto the display panel, a partial image corresponding to touch data of the detected touch while maintaining the host processor in the low power status, when the touch data of the detected touch is provided from the touch sensor IC.

In accordance with another aspect of the present disclosure, an electronic device may include a touch sensor, a touch sensor IC which detects a touch through the touch sensor, a display panel, and a display driving integrated circuit (IC) which drives the display panel and include a graphic RAM (GRAM) to store an image received from the host processor. The image may include a plurality of partial images. The touch sensor IC may provide the touch data of the detected touch to the display driving IC when the detected touch corresponds to a specified touch pattern. The display driving IC may specify a partial image based on the touch data and may output the specific partial image onto the display panel.

As described above, according to an embodiment, even if a processor is not involved, multiple pieces of AOD content may be provided in response to a touch of the user. Besides, a variety of effects directly or indirectly understood through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the disclosure will be more apparent from the following description taken in conjunction with the accompanying drawings, in which.

In the following description made with respect to the accompanying drawings, similar elements will be assigned with similar reference numerals.

DETAILED DESCRIPTION

Figure 1:
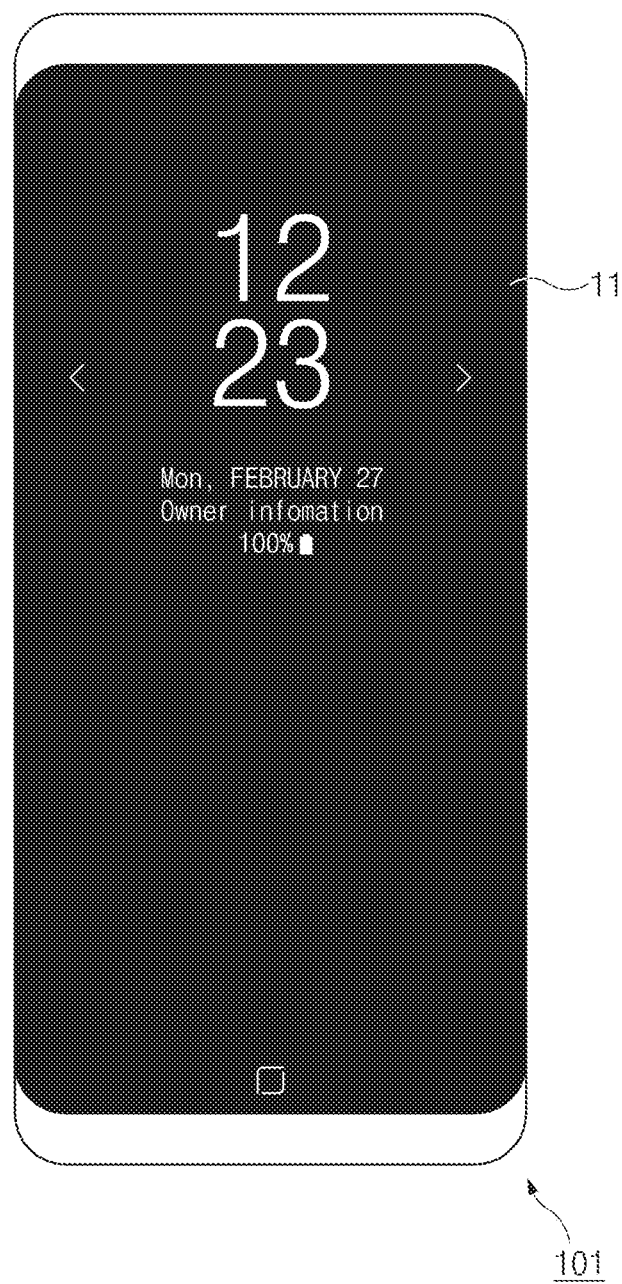
FIG. 1 illustrates an electronic device, according to an embodiment of the present disclosure.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

An electronic device according to various embodiments of this disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which has measurement function of personal biometric information (e.g., heart rate or blood glucose). In this disclosure, the term "user" may refer to a person who uses an electronic device or may refer to a device (e.g., an artificial intelligence electronic device) that uses the electronic device.

FIG. 1 illustrates an electronic device, according to an embodiment of the present disclosure.

Referring to FIG. 1, according to an embodiment, an electronic device 101 may support an active status allowing a user to concentratedly use the function of the electronic device 101 and an inactive status for waiting for the use of the user.

According to an embodiment, in the active status, various hardware modules and/or software modules included in the electronic device 101 may sufficiently perform the intrinsic functions thereof. In an embodiment, the electronic device 101 may sufficiently receive power from a battery. For example, the electronic device 101 may switch the inactive status to the active status in response to a user manipulation (e.g., pressing of a physical button or a specific touch gesture). The active status may be referred to as various terms such as a wake-up status, an awake status, a wake-up mode, an awake-mode, a general mode, an active mode, or the like, but is not limited to a term used in the present disclosure. The following description will be made by using the term of "wake-up status".

For example, in the active state, a display 11 including a touch screen of the electronic device 101 may display various pieces of content (e.g., an image, a video, or the like) required from the user. In addition, the display 11 including the touch screen may sense a touch (or a touch gesture) from the user with a higher sensitivity. The display 11 including the touch screen may receive an image from a host through a display driver integrated circuit (IC) at a specific frame frequency or frame rate (e.g., 60 Hz) to display various pieces of content.

According to an embodiment, in the inactive status, various hardware modules and/or software modules included in the electronic device 101 may be deactivated or may perform only limited functions. To this end, the modules may receive limited power from the battery. Accordingly, since information processing or arithmetic operations by the hardware module and/or software module are restricted, battery use time is enhanced. For operation in the inactive status, the processor of the electronic device 101 may control the hardware module and/or the software module to perform only the limited functions. The inactive status may be referred to as various terms such as a sleep status, a low power status, a sleep mode, an inactive mode, an idle status, an idle mode, a stand-by status, a stand-by mode, or the like, but the present disclosure is not limited to a term which is used. The following description will be made by using the term of "sleep status" or "low power status".

For example, in the sleep status, the display 11 including the touch screen of the electronic device 101 may display only limited content (e.g., an image, a text, an icon, or the like). In addition, the display 11 including the touch screen may sense the touch (or a touch gesture) from the user with a lower sensitivity. In the sleep status, the display 11 including the touch screen may not receive an image from a host during a specific time and may display the limited content through only the operation of the display driving IC (called "Panel Self Refresh").

FIG. 1 illustrates the electronic device 101 operating in the sleep status. For example, the electronic device 101 operating in the sleep status may output specified content (e.g., a text/image representing a digital clock, a date, and a battery status; hereinafter, referred to as AOD content) onto the display 11 including the touch screen.

According to an embodiment, pixels constituting the AOD content may represent specified color (e.g., white). According to various embodiments, remaining pixels constituting a background other than the AOD content may be set to represent specified color (e.g., black color). For example, when the display 11 including the touch screen includes an organic light emitting diode (OLED) panel, the pixels constituting the background may be turned off.

According to an embodiment, the AOD content may periodically or aperiodically move up, down, left, or right. This is to prevent the burn-in phenomenon of pixels (e.g., OLED pixels) for expressing a text, an image, a GUI object included in the AOD content. According to various embodiments, to prevent the burn-in phenomenon, sub-pixels included in each of pixels constituting the AOD content may alternately emit light.

According to various embodiments of the present disclosure, in the electronic device 101 operating in the sleep status, the display 11 including the touch screen may sense the touch, which is made by the user, with limited power consumption. The following description will be made, with reference to accompanying drawings, regarding a method for allowing the electronic device 101 operating in the sleep status to provide various pieces of AOD content in response to a touch and the electronic device 101 performing the method.

Figure 2:
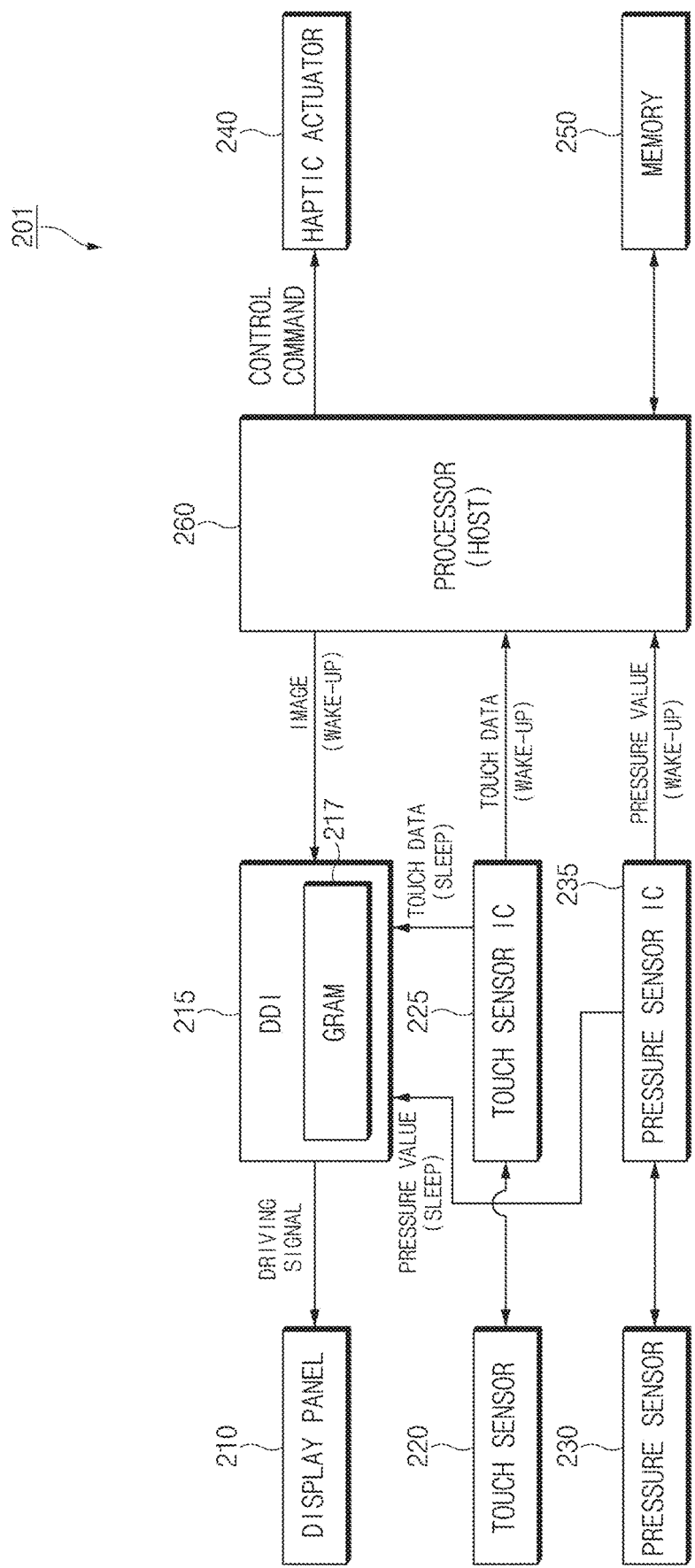
FIG. 2 illustrates block diagram of the electronic device, according to an embodiment of the present disclosure.

FIG. 2 is a block diagram illustrating the electronic device, according to an embodiment.

Referring to FIG. 2, according to an embodiment, an electronic device 201 may include a display panel 210, a display driving IC (DDI) 215, a touch sensor 220, a touch sensor IC 225, a pressure sensor 230, a pressure sensor IC 235, a haptic actuator 240, a memory 250, and a host processor 260. According to various embodiments, the electronic device 201 may not include some of elements illustrated in FIG. 2. In addition, the electronic device 201 may further include an element (e.g., an electronic pen panel (e.g., a digitizer) to sense the input from an electronic pen (e.g., a stylus)) which is not illustrated in FIG. 2. For example, when the electronic pen panel is included, an integrated circuit (IC) driving the electronic pen panel may operate similarly to the touch sensor IC 225.

The display panel 210 may receive an image signal from the DDI 215. The display panel 210 may display various pieces of content (e.g., a text, an image, a video, an icon, a widget, a symbol, or the like) based on the image signal.

The DDI 215 may be electrically connected with the display panel 210. The DDI 215 may drive the display panel 210 such that the image received from the host processor 260 is displayed on the display panel 210. For example, the DDI 215 may store image data, which is received from the host processor 260, in a graphic random access memory (GRAM) 217 and may provide an image signal corresponding to the image data to the display panel 210.

According to an embodiment, the DDI 215 may provide an image signal to the display panel 210 at a specified frame rate (e.g., 60 HZ) in a wake-up status. In this case, the host processor 260 may provide image data corresponding to the image signal to the DDI 215 at a higher frequency in the wake-up status.

According to an embodiment, the DDI 215 may provide an image signal to the display panel 210 at a lower frame rate (e.g., 30 HZ), based on image data (or partial image data), which is previously stored in the GRAM 217, in the sleep status (Panel Self Refresh operation). In this case, the host processor 260 may temporarily operate in the wake-up status at an initial stage to provide image data to the DDI 215 and may not be involved in the Panel Self Refresh operation of the DDI 215. In other words, the host processor 260 may not provide the image data to the DDI 215 during the Panel Self Refresh operation.

In the touch sensor 220, a specified physical quantity (e.g., a voltage, a light quantity, a resistance, the quantity of electric charges, a capacitance, or the like) may be varied by the touch from the user. The touch sensor 220 may sense a touch based on the specific physical quantity. According to various embodiments, the touch sensor 220 may be referred to as various terms such as a touch panel, a touch circuit, or the like. According to various embodiments, the touch sensor 220 may be disposed on a top surface or a bottom surface of the display panel 210 or may be implemented as one element by being assembled with the display panel 210. The assembly of the display panel 210 and the touch sensor 220 may be referred to as "touch screen display".

The touch sensor IC 225 may be electrically connected with the touch sensor 220 to sense the variation (that is, a touch) of the physical quantity in the touch sensor 220 and to detect the touch. The touch sensor IC 225 may calculate data (touch data) on the sensed touch. For example, the touch data may include at least one of position (coordinate data (X, Y) of the position at which the touch is made) of the touch on the touch sensor 220, the type of the touch, or the duration of the touch.

According to an embodiment, when the electronic device 201 operates in the wake-up status, the touch sensor IC 225 may provide the touch data to the host processor 260. Meanwhile, when the electronic device 201 operates in the sleep status, the touch sensor IC 225 may provide the touch data to the DDI 215.

Figure 3:
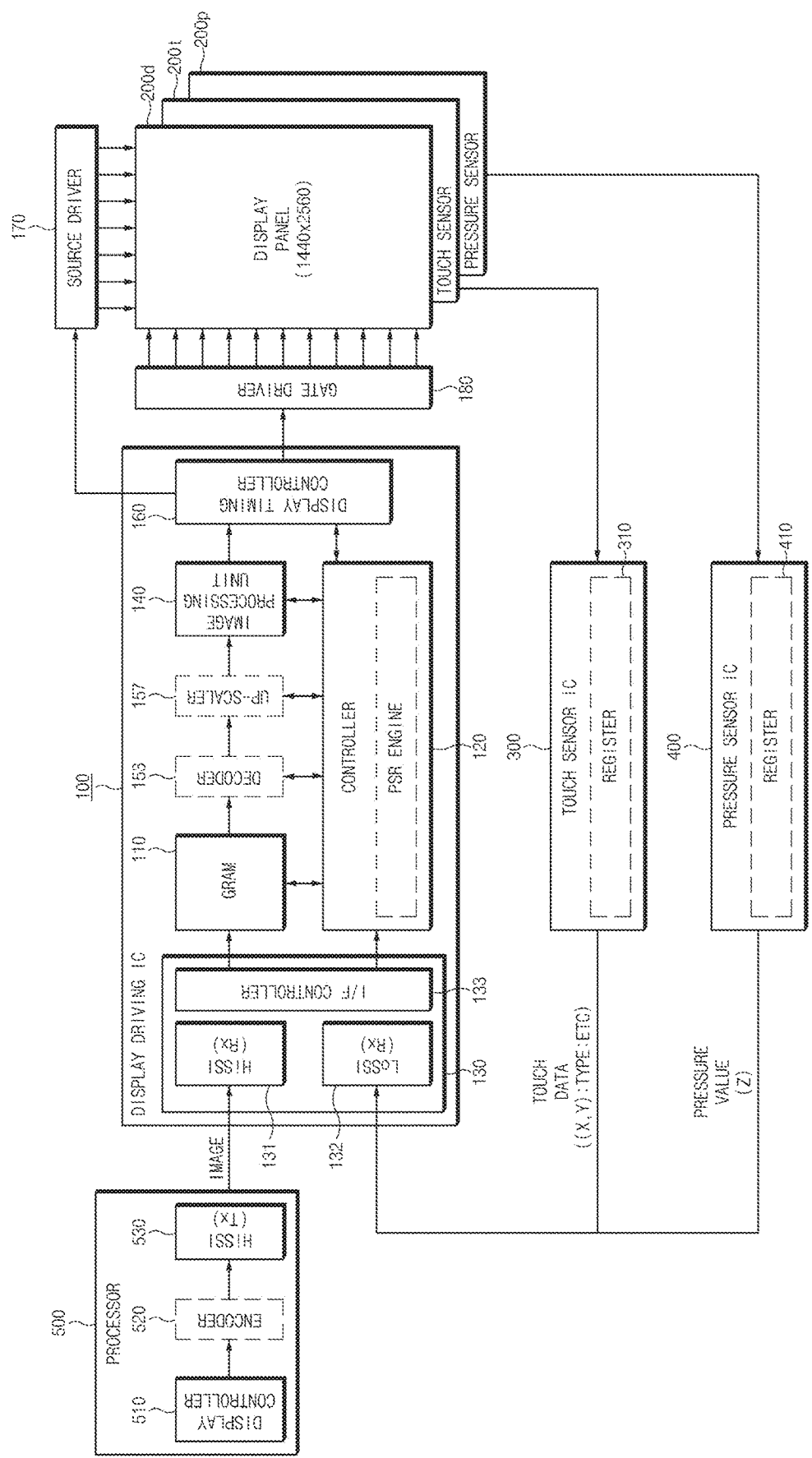
FIG. 3 illustrates a block diagram of the electronic device including a display driving IC, according to an embodiment of the present disclosure.

According to an embodiment, the touch sensor IC 225 may include an embedded memory (e.g., a register 310 of FIG. 3). The memory may store, for example, information on a region in which the touch is recognized in the sleep status, information on the specified touch pattern, or the like. In the sleep status, the touch sensor IC 225 may provide the touch data of the detected touch to the DDI 215 when the detected touch corresponds to the touch pattern stored in the memory.

According to various embodiments, the touch sensor IC 225 may be referred to as a touch controller, a touch IC, a touch screen IC, a touch screen controller IC, or the like. According to an embodiment, in the electronic device 201 having no touch sensor IC 225, the host processor 260 may perform the function of the touch sensor IC 225. In addition, according to an embodiment, the touch sensor IC 225 may be implemented integrally with the DDI 215 to be unified as one element. The element may be referred to as a touch display driving IC (TDDI).

The pressure sensor 230 may sense pressure (or force) applied by an external object (e.g., a finger or an electronic pen). According to an embodiment, the pressure sensor 230 may include a plurality of electrodes (at a transmit stage (Tx) and a receive stage (Rx)) with a dielectric layer interposed between the electrodes. When pressure is applied by the external object, the physical quantity (e.g., capacitance) between the electrodes may be varied.

The pressure sensor IC 235 may sense the variation of the physical quantity (e.g., capacitance, or the like) in the pressure sensor 230 and may calculate (or detect) a pressure value (Z) based on the variation of the physical quantity. According to various embodiments, the pressure sensor IC 235 may be referred to as a force touch controller, a force sensor IC, or a pressure panel IC.

According to an embodiment, when the electronic device 201 operates in the wake-up status, the pressure sensor IC 235 may provide the detected pressure value to the host processor 260. In contrast, when the electronic device 201 operates in the sleep status, the pressure sensor IC 235 may provide the detected pressure value to the DDI 215.

According to an embodiment, the pressure sensor IC 235 may include an embedded memory (e.g., a register 410 of FIG. 3). For example, the memory may store information on a region in which the pressure of the touch is recognized and information for discretely distinguishing pressure strength of the detected touch, in the sleep status. For example, in the sleep status, the pressure sensor IC 235 may provide a first pressure value to the DDI 215 when the pressure strength of the touch is equal to or greater than the first threshold value. In addition, the pressure sensor IC 235 may provide a second pressure value to the DDI 215 when the pressure strength of the touch is equal to or greater than a second threshold value (first threshold value<second threshold value).

According to various embodiments, the pressure sensor IC 235 may be implemented integrally with the touch sensor IC 225 and/or DDI 215 to be unified as one element (e.g., one-chip).

The haptic actuator 240 may provide a haptic feedback (e.g., vibration) to the user under the control of the host processor 260. For example, the haptic actuator 240 may provide the haptic feedback to the user when the touch (e.g., a touch hovering or a force touch) of the user is detected.

The memory 250 may store a command or data associated with the operation of the element included in the electronic device 201. For example, the memory 250 may store image data provided to the DDI 215.

The host processor 260 may include one of a central processing unit (CPU), a graphic processing unit (GPU), an application processor (AP), a communication processor (CP), or a sensor hub to control a plurality of sensors at low power. For example, the host processor 260 may be electrically connected with elements 210 to 250 included in the electronic device 201 to perform arithmetic operations or data processing associated with the control and/or communication of the elements 210 to 250.

According to an embodiment of the present disclosure, the host processor 260 may provide an image read out of the memory 250 or an image created by the host processor 260 to the DDI 215. The DDI 215 may store the received image in the embedded GRAM 217. The host processor 260 may enter a sleep status (or low power status) after storing the image in the GRAM 217. The host processor 260 may maintain the sleep status while the touch is detected and the image corresponding to the touch is output onto the display panel.

According to an embodiment, the image stored in the GRAM 217 may include a plurality of partial images. For example, the partial images may be concatenated with each other in terms of a data structure to form an image of one frame. In addition, for example, the aspect ratios of the partial images may correspond to (substantially equal to) an aspect ratio of the whole image including the partial images or may correspond to (substantially equal to) an aspect ratio of the display panel (see FIG. 4). The image including the partial images may be referred to "a whole image" to distinguish from the term of "partial image".

According to an embodiment, while the host processor 260 is operating in a low power status, the DDI 215 may selectively output one of the partial images stored in the GRAM 217 onto the display panel 210.

According to an embodiment, when the DDI 215 receives the touch data of the detected touch from the touch sensor IC 225, the DDI 215 may selectively output a partial image corresponding to the touch data onto the display panel 210 while the low power status of the host processor 260 is being maintained.

According to an embodiment, the touch sensor IC 225 may provide the touch data of the detected touch to the DDI 215 when the detected touch by the touch sensor 220 corresponds to a specified touch pattern. For example, the touch pattern may be defined based on at least one of the position of the detected touch on the touch sensor 220, the type of the touch (e.g., a single tap, a double tap, a triple tap, a touch swipe, a long press, a touch gesture, or the like), a touch shape, a touch region, or the duration of the touch. For example, the specified touch pattern may include a double tap in a region occupied by a specific UI object or a long press made for 2 seconds at a specific position (or a region).

According to an embodiment, the DDI 215 may specify a partial image based on the touch data provided from the touch sensor IC 225 and may output the specific partial image onto the display panel 210. For example, the DDI 215 may use a data address on the GRAM 217 and/or a data size of the partial image to be output to specify the partial image linked to the touch data.

According to various embodiments, the whole image received from the host processor 260 may include a plurality of partial images. In this case, the DDI 215 may enlarge a partial image specified based on the touch data at a specified magnification and may output the enlarged partial image onto the display panel 210. In addition, according to various embodiments, the aspect ratio of the partial image specified based on the touch data may not be matched with the aspect ratio of the display panel 210. In this case, the DDI 215 may adjust the aspect ratio of the specified partial image to the aspect ratio (specified aspect ratio) of the display panel 210.

According to various embodiments, the image received from the host processor 260 and stored in the GRAM 217 may be an image encoded in a specified scheme (e.g., a display stream compression (DSC) determined in a video electronics standards association (VESA)). Since the data size of the image is reduced through the encoding, one or more encoded images may be stored in the GRAM 217. For example, when the data size of the image is reduced to 1/n times the original data size of the image, through the encoding, n pieces of encoded image data may be stored in the GRAM 217. In this case, the DDI 215 may specify the partial image by selecting some of the encoded images and may decode the selected images in a decoding scheme corresponding to the encoding scheme. The result image of the decoding may be output onto the display panel 210.

According to various embodiments, the DDI 215 may adjust the output duration of the partial image specified in the above-described various schemes, based on the touch of the user. For example, when the type of the detected touch is a long press, the DDI 215 may output the partial image specified for a time in which the long press is made. For another example, the DDI 215 may determine the output duration of the partial image specified based on the pressure value received from the pressure sensor IC 235 (see FIG. 6).

FIG. 3 illustrates a block diagram of the electronic device including a display driving IC, according to an embodiment of the present disclosure.

Referring to FIG. 3, according to an embodiment, an electronic device includes a DDI 100, a source/gate driver 170/180, a display panel 200d, a touch sensor 200t, a pressure sensor 200p, a touch sensor IC 300, a pressure sensor IC 400, and a processor 500. In the following description made with reference to FIG. 3, parts the same as or similar to those of the description made with reference to FIG. 2 will be omitted to avoid redundancy.

According to an embodiment, the processor 500 may include a display controller 510, an encoder 520, and a transmit (Tx) high speed serial interface (HiSSI) 530.

The display controller 510 may temporarily operate in the wake-up status and may create an image or may read an image from the memory. According to an embodiment, the image may be formed by concatenating a plurality of partial images with each other. According to an embodiment, the partial images may have the resolution lower than the resolution of the display panel 200d. In addition, for example, the aspect ratios of the partial images may be equal to the aspect ratio of the whole image or the aspect ratio of the display panel 200d.

The encoder 520 may encode image data created by the display controller 510 in a specific scheme (e.g., a DSC scheme determined in the VESA). Accordingly, the image created by the display controller 510 is compressed and may have a data size which is reduced. For example, the data size of the image created by the display controller 510 may be reduced to 1/n times the original size of the image data, through the encoding. According to various embodiments, the encoder 520 may be omitted or bypassed. In this case, the image may be transmitted to the DDI 100 without encoding or compression.

The processor 500 may transmit the image data encoded by the encoder 520 to the DDI 100 through the Tx HiSSI 530. The processor 500 may enter the sleep status after transmitting the image to the DDI 100.

According to an embodiment, the DDI 100 may include a GRAM 110, a controller 120, an interface module 130, an image processing unit 140, a decoder 153, an up-scaler 157, and a display timing controller (T-con) 160.

The DDI 100 may receive an encoded image through the interface module 130 from the processor 500. According to an embodiment, the encoded image may be received through an Rx HiSSI 131. When the image is received, the DDI 100 and the elements included in the DDI 100 may perform following operations referred to as the Panel Self Refresh operation.

The GRAM 110 may store at least one image received through the Rx HiSSI 131. The data size of the received image may correspond to, but is not limited to, the storage space of the GRAM 110. The storage space of the GRAM 110 may be correspond to, but is not limited to, the data size of one frame image of the display panel 200d. In this case, the data size of the image stored in the GRAM 110 may correspond to a data size of one frame image of the display panel 200d. According to an embodiment, when the data size of the image is compressed to 1/n times the original data size of the image by the encoder 520 of the processor 500, n pieces of encoded image data may be stored in the GRAM 110.

The controller 120 may receive touch data from the touch sensor IC 300. For example, the controller 120 may read touch data from the register 310 included in the touch sensor IC 300, in response to that an interrupt is received from the touch sensor IC 300. The controller 120 may specify at least one partial image of the whole image stored in the GRAM 110 based on the touch data. For example, the controller 120 may use a data address on the GRAM 217 and/or a data size of the partial image to be output to specify the partial image linked to the touch data.

Meanwhile, according to an embodiment, when the image stored in the GRAM 110 is encoded, the controller 120 may select a portion of the encoded image. The Panel Self Refresh operation of the controller 120 may be implemented in hardware logic or software and may be embedded in the controller 120. The hardware logic or software for performing the Panel Self Refresh may be referred to as "PSR Engine".

The interface module 130 may include the Rx HiSSI 131, an Rx LoSSI 132, and an interface controller 133 which controls the Rx HiSSI 131 and the Rx LoSSI 132. According to an embodiment, the image from the processor 500 may be received through the Rx HiSSI 131. According to an embodiment, the touch data from the touch sensor IC 300 and/or the pressure value from the pressure sensor IC 400 may be received through the Rx LoSSI 132.

The image processing unit 140 may improve image quality by correcting an image. The image processing unit 140 may include, but is not limited to, a pixel data processing circuit, a pre-processing circuit, a gamma correction circuit, and a gating circuit.

The decoder 153 may decode the partial image in a specified scheme when a partial image specified (or selected) by the controller 120 is encoded. The decoded partial image may be transmitted to the T-con 160. For example, when the data size is compressed to 1/n times the original data size by the encoder 520 of the processor 500, the decoder 153 may release the compression of the partial image and may recover the partial image to an original image before encoding.

The up-scaler 157 and/or the image processing unit 140 may be interposed between the decoder 153 and the T-con 160. According to various embodiments, when the image is not encoded by the processor 500, the decoder 153 may be omitted or bypassed.

The up-scaler 157 may enlarge an image at a specified magnification (e.g., m times). According to an embodiment, the up-scaler 157 may enlarge the partial image when the partial image specified by the controller 120 is a low-resolution image or needs to be enlarged depending on environment settings. For example, the partial image selected by the controller 120 may be enlarged at the specified magnification.

The partial image enlarged by the up-scaler 157 may be transmitted to the T-con 160. In this case, the image processing unit 140 may be interposed between the up-scaler 157 and the T-con 160. According to various embodiments, when the specified partial image needs not be enlarged, the up-scaler 157 may be omitted or bypassed.

When the received partial image is transformed to an image signal, the T-con 160 may provide the image signal to a source driver 170 and a gate driver 180 at a specified frame rate (e.g., 60 Hz in a wake-up status, 30 Hz in a sleep status). Accordingly, the specified partial image may be output onto the display panel 200d.

The source driver 170 and the gate driver 180 may provide electrical signals to a scan line and a data line of the display panel 200d under the control of the T-con 160.

The display panel 200d may operate pixels of the display panel 200d based on electrical signals provided thereto from the source driver 170 and the gate driver 180. Various pieces of content may be provided for the user by light emitted from the pixels. The display panel 200d may have the resolution of, for example, 1440×2560 or 1440×2960.

The touch sensor 200t may be disposed in overlap with the display panel 200d or may be included in the display panel 200d.

The touch sensor IC 300 may include the register 310 to store data on the touch sensed by the touch sensor 200t. For example, the touch sensor IC 300 may calculate the position (X, Y) of the touch and may determine the type of the touch, when sensing the touch by the touch sensor 200*t*. In addition, the touch sensor IC 300 may determine the duration of the touch by sensing the touch down and the touch release of the touch. The position, the type, or the duration of the touch may be included in the touch data and may be provided to the DDI 100.

According to an embodiment, when the touch is detected by the touch sensor 200*t*, the touch sensor IC 300 may write the touch data (the position, the type, or the duration of the touch) of the detected touch to the register 310. When the detected touch corresponds to the specified touch pattern, the touch sensor IC 300 may transmit the interrupt to the DDI 100. The DDI 100 may read the touch data of the detected touch out of the register 310 in response to the interrupt.

The pressure sensor 200*p* may be disposed on the rear surface of the display panel 200*d* and/or the touch sensor 200*t*. Although FIG. 3 illustrates the pressure sensor 200*p* in the panel form, the present disclosure is not limited thereto. For example, the pressure sensor 200*p* may be implemented as a module having a specified size and may be disposed on a partial region of the rear surface of the display panel 200*d* and/or the touch sensor 200*t*.

The pressure sensor IC 400 may include a register 410 which is to store the value of the pressure sensed by the pressure sensor 200*p*. For example, the pressure sensor IC 400 may calculate a pressure value Z when the pressure sensor 200*p* detects a pressure value equal to or greater than a specified value. The pressure value Z may be provided by the DDI 100.

According to an embodiment, the pressure sensor IC 400 may write the detected pressure value to the register 410 and may transmit an interrupt to the DDI 100, when the pressure sensor 200*p* detects the pressure value equal to or greater than the specified value. The DDI 100 may read the pressure value out of the register 410 in response to the interrupt.

In FIG. 3, the encoder 520 and the decoder 153 corresponding to the encoder 520 may be included in the processor 500 and the DDI 100, respectively. In addition, FIG. 3 illustrates the DDI 100 including the up-scaler 157. However, according to various embodiments, at least one of the encoder 520, the decoder 153, and the up-scaler 157 may be omitted.

Figure 4:
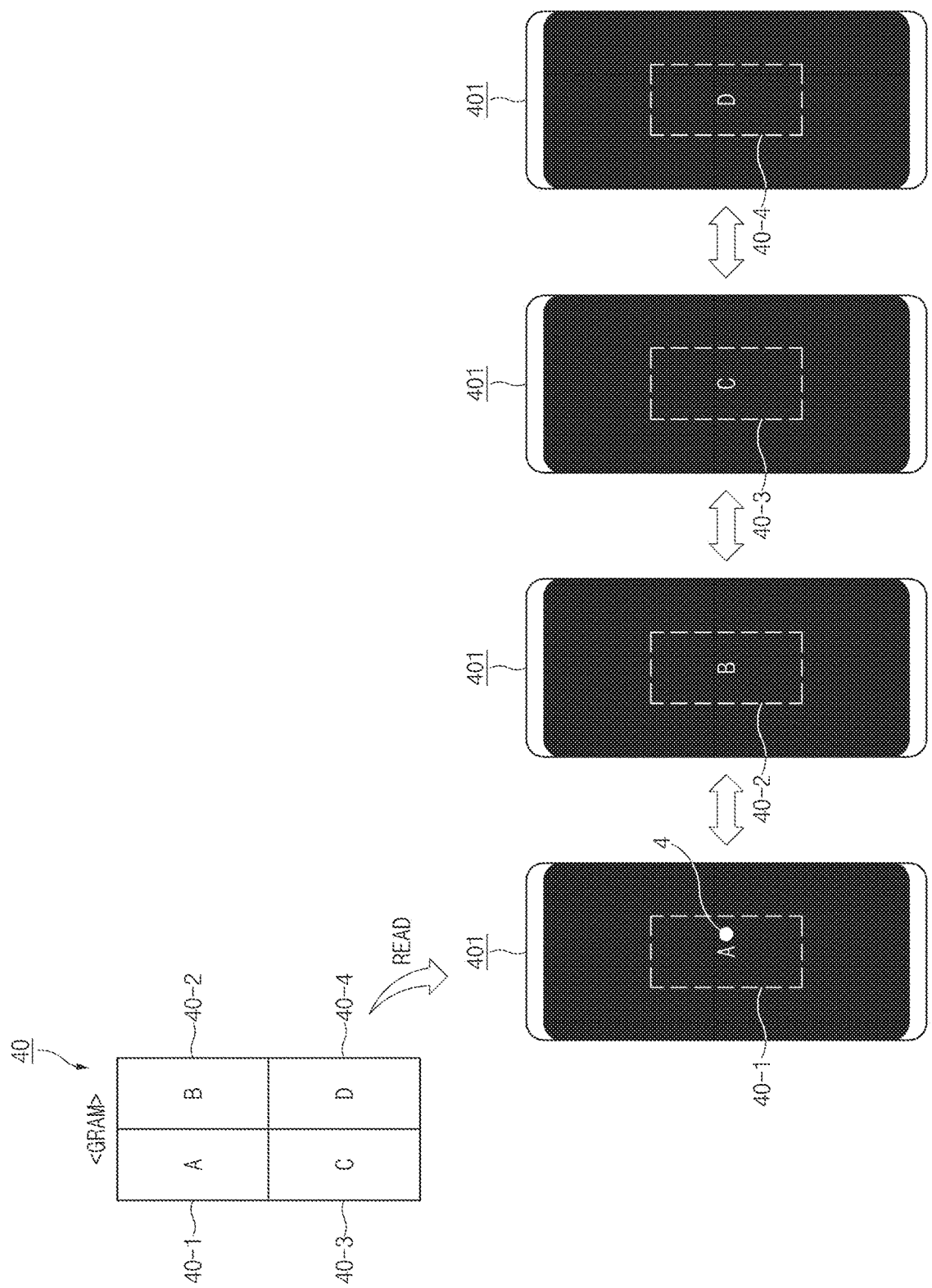
FIG. 4 is a view illustrating an AOD, according to an embodiment of the present disclosure.

FIG. 4 is a view illustrating an AOD, according to an embodiment of the present disclosure.

Referring to FIG. 4, an electronic device 401 and a GRAM of a DDI included in the electronic device 401 are illustrated. A processor of the electronic device 401 may operate in a sleep status. The DDI of the electronic device 401 may perform a Panel Self Refresh operation.

According to an embodiment, the GRAM of the DDI may store an image 40. The image 40 may include a partial image A 40-1, a partial image B 40-2, a partial image C 40-3, and a partial image D 40-4. The partial images 40-1 to 40-4 may be concatenated with each other on the GRAM. The aspect ratios of the partial images 40-1 to 40-4 may be, for example, equal to the aspect ratio of the whole image 40. In addition, the aspect ratios of the partial images 40-1 to 40-4 and the aspect ratio of the whole image 40 may be equal to the aspect ratio of the display panel provided in the electronic device 401.

According to an embodiment, the partial images 40-1 to 40-4 may be images independent from each other. For example, each of the partial images 40-1 to 40-4 may include an image informative to the user, such as a clock image, a calendar image, a UI object to which a specified operation is allocated, a controller image of a multimedia player, an image on content reproduced through the multimedia player, an image of items registered in a planer, a drawing authored by the user, or an abstract of notification.

According to an embodiment, the electronic device 401 may read the partial image A 40-1 serving as AOD content out of the GRAM and may output the partial image A 40-1 onto a display panel. The DDI of the electronic device 401 may output the partial image A 40-1 onto a specified region of the display panel, without intervention of the processor.

According to an embodiment, the user may make a touch 4 on a screen onto which the partial image A 40-1 is output. The touch sensor IC of the electronic device 401 may detect the touch 4 by using a touch sensor and may determine whether the detected touch 4 corresponds to a specified touch pattern. The touch sensor IC may provide touch data of the detected touch 4 to the DDI when the detected touch 4 corresponds to the specified touch pattern. The DDI may specify one of the partial image B 40-2, the partial image C 40-3, and the partial image D 40-4, based on the touch data.

For example, when the touch data of the touch 4 is linked to the partial image B 40-2, the DDI may output the partial image B 40-2 onto the display panel in place of the partial image A 40-1. For example, when outputting the partial image B 40-2, the DDI may employ a specified image effect (e.g., a fade in/fade out, or curtain effect) for natural image switching.

According to various embodiments, the type of the detected touch 4 may be a long press in which a touch is continuously detected during a specified time or more. In this case, the DDI of the electronic device 401 may determine output duration of the partial image B 40-2 based on the time in which the long press is made. For example, when the long press is made for 7 seconds, the DDI may output the partial image B 40-2 for 7 seconds and then may output the partial image A 40-1 again.

According to various embodiments, the pressure sensor IC of the electronic device 401 may calculate the pressure value of the touch 4 when the pressure value equal to or greater than a specified value is detected through the touch 4 by the pressure sensor. The pressure value of the touch 4 may be provided to the DDI. The DDI may determine the output duration of the partial image B 40-2 based on the pressure value of the touch 4. For example, when the pressure value of the touch 4 exceeds the first threshold value, the DDI may output the partial image B 40-2 for 5 seconds and then may output the partial image A 40-1 again. For another example, when the pressure value of the touch 4 exceeds the second threshold value (second threshold value>first threshold value), the DDI may output the partial image B 40-2 for 10 seconds and then may output the partial image A 40-1 again.

According to the embodiment described with reference to FIG. 4, various pieces of AOD content may be provided in response to the touch of the user without the intervention of the processor of the electronic device 401.

Figure 5:
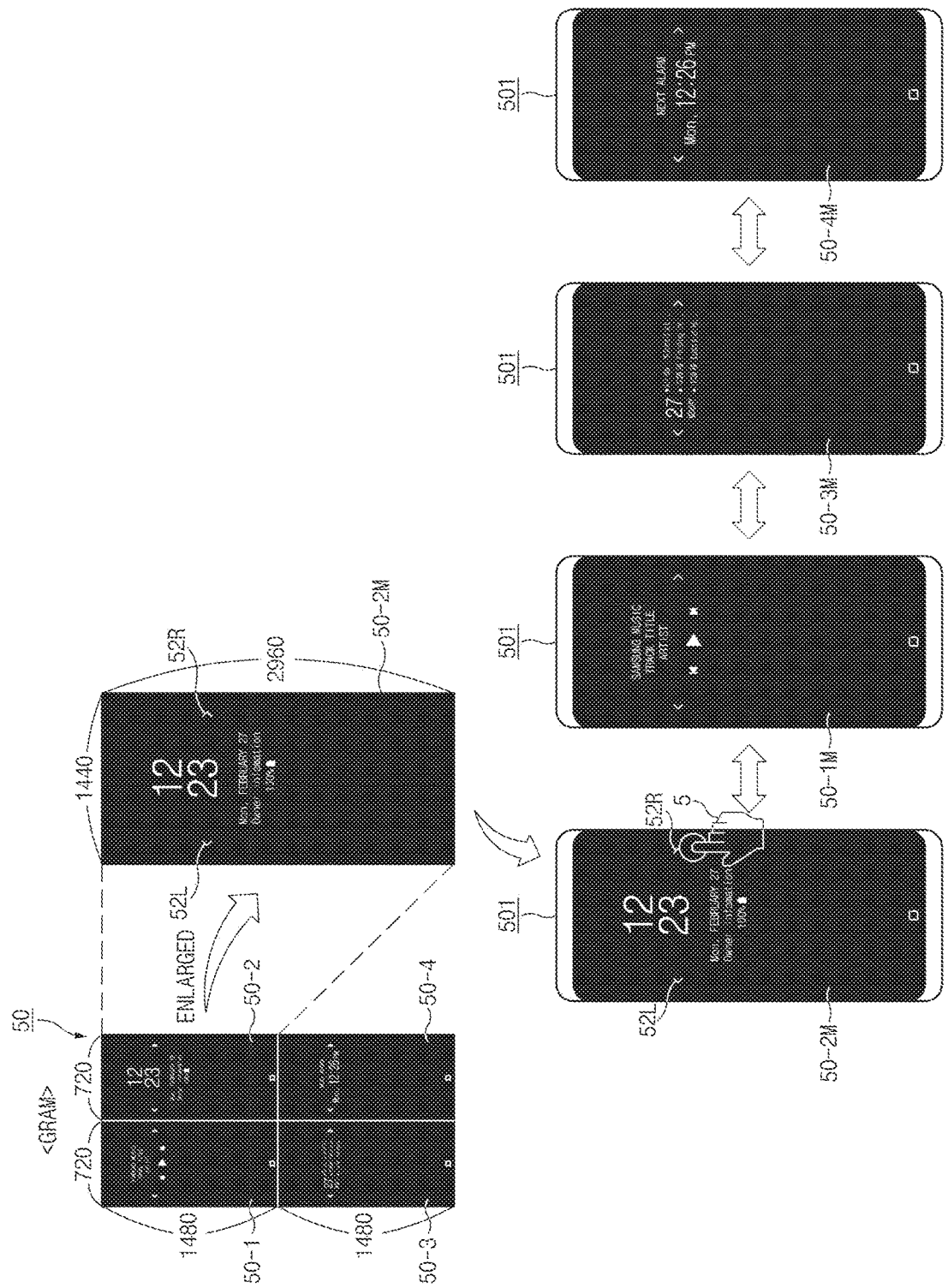
FIG. 5 is a view illustrating an AOD to which an up-scaler is applied, according to an embodiment of the present disclosure.

FIG. 5 is a view illustrating an AOD to which an up-scaler is applied, according to an embodiment of the present disclosure.

Referring to FIG. 5, an electronic device 501 and a GRAM of a DDI included in the electronic device 501 are illustrated. A processor of the electronic device 501 may operate in a sleep status and the DDI of the electronic device 501 may perform a Panel Self Refresh operation. In the following description, the parts overlapped with the description made with reference to FIG. 4 may be omitted.

According to an embodiment, the GRAM of the DDI may store an image 50. The image 50 may include a partial image 50-1, a partial image 50-2, a partial image 50-3, and a partial image 50-4. For example, the aspect ratios 1480:720 of the partial images 50-1 to 50-4 may be equal to the aspect ratio 2960:1440 of the whole image 50. The aspect ratios 1480:720 of the partial images 50-1 to 50-4 and the aspect ratio 2960:1440 of the whole image 50 may be equal to the aspect ratio 2960:1440 of the display panel provided in the electronic device 501.

According to an embodiment, the partial images 50-1 to 50-4 may be images independent from each other. For example, the partial image 50-1 may include a controller image of a multi-media player, the partial image 50-2 may include a digital clock image, the partial image 50-3 may include an image of items registered in a planer, and the partial image 50-4 may include an image representing an alarm setting time.

According to an embodiment, the DDI of the electronic device 501 may read the partial image 50-2 from the GRAM and may enlarge the partial image 50-2. For example, the DDI may enlarge the partial image 50-2 to two times in width/two times in length, based on the resolution of the partial image 50-2. The DDI may output an enlarged partial image 50-2M serving as AOD content onto the display panel, without the intervention of the processor.

According to an embodiment, each of the partial images 50-1, 50-2, 50-3, and 50-4 may further include a UI object (e.g., a symbol or an icon) linked to another partial image. For example, referring to the enlarged partial image 50-2M, the enlarged partial image 50-2M may include a UI object 52L linked to the partial image 50-4 and a UI object 52R linked to the partial image 50-1.

According to an embodiment, the user may make a touch 5 on a screen of the electronic device 501 onto which the enlarged partial image 50-2M is output. The touch sensor IC of the electronic device 501 may detect the touch 5 using the touch sensor and may determine whether the detected touch 5 corresponds to a touch pattern (an example of a specified touch pattern) representing the selection for the UI object 52R. The touch sensor IC may provide touch data of the detected touch 5 to the DDI when the detected touch 5 represents the selection for the UI object 52R. The DDI may select or specify the partial image 50-1 based on the touch data.

For example, the DDI may enlarge the partial image 50-1 to two times in width/two times in length, based on the resolution of the partial image 50-1. The DDI may output an enlarged partial image 50-1M serving as AOD content onto the display panel.

According to various embodiments, the user may touch a UI object 52L on a screen of the electronic device 501 to which an enlarged partial image 50-2M is output. In this case, the electronic device 501 may operate similarly to the case that the UI object 52R is touched. In other words, the touch sensor IC of the electronic device 501 may detect the touch to the UI object 52L by using the touch sensor. The touch sensor IC of the electronic device 501 may determine that the detected touch corresponds to a touch pattern (an example of a specified touch pattern) representing the selection for the UI object 52L. The touch sensor IC may provide the touch data of the detected touch to the DDI. The DDI may select or specify the partial image 50-4 based on the touch data.

For example, the DDI may enlarge the partial image 50-4 to two times in width/two times in length, based on the resolution of the partial image 50-4. The DDI may output an enlarged partial image 50-4M serving as AOD content onto the display panel.

According to an embodiment illustrated in FIG. 5, the touch to the UI object included in the enlarged partial image 50-2M may cause another partial image to be enlarged and output. Accordingly, various pieces of AOD content may be provided in response to the touch of the user without the intervention of the processor of the electronic device 501.

Figure 6:
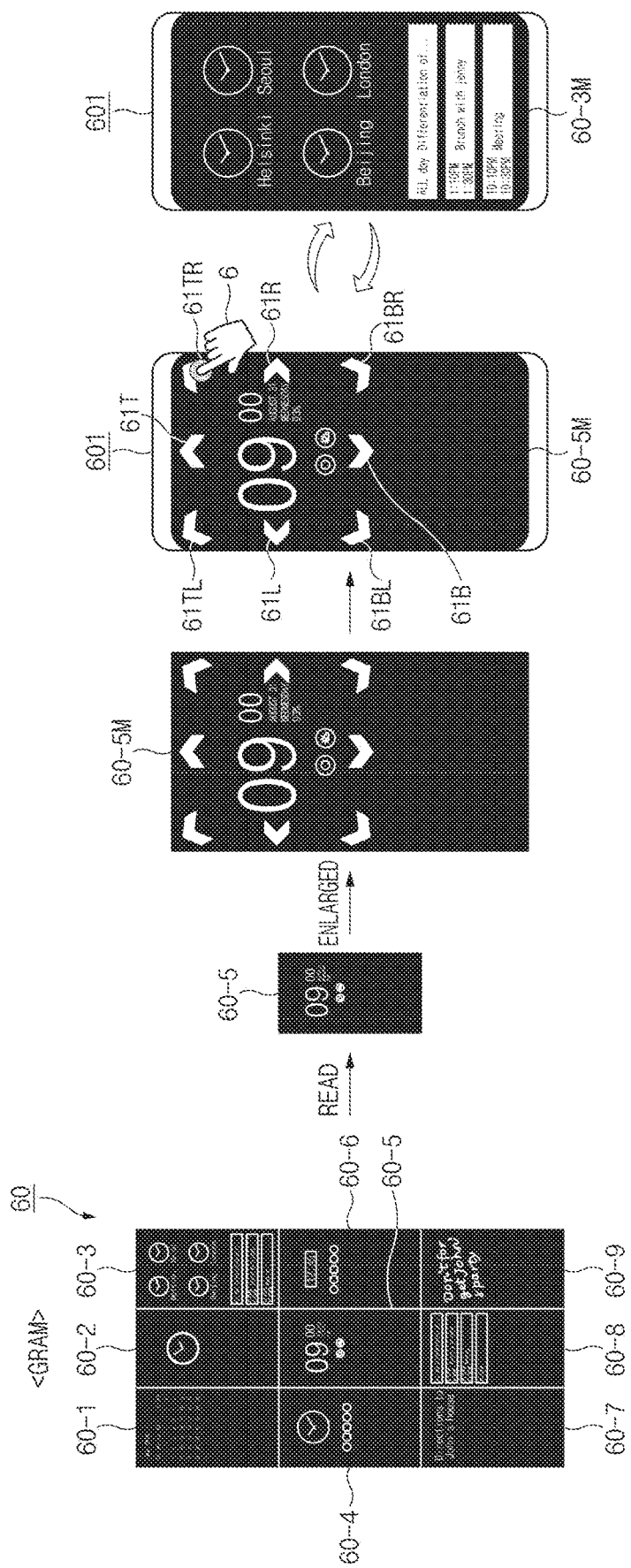
FIG. 6 is a view illustrating an AOD to which an up-scaler is applied, according to an embodiment of the present disclosure.

FIG. 6 is a view illustrating an AOD to which an up-scaler is applied, according to an embodiment of the present disclosure.

Referring to FIG. 6, an electronic device 601 and a GRAM of the DDI included in the electronic device 601 are illustrated. A processor of the electronic device 601 may operate in a sleep status. The DDI of the electronic device 601 may perform a Panel Self Refresh operation. In the following description, the parts overlapped with the description made with reference to FIGS. 4 and 5 may be omitted.

According to an embodiment, the GRAM of the DDI may store an image 60. The image 60 may include a partial image 60-1, a partial image 60-2, a partial image 60-3, a partial image 60-4, a partial image 60-5, a partial image 60-6, a partial image 60-7, a partial image 60-8, and a partial image 60-9. According to an embodiment, the partial images 60-1 to 60-9 may be images independent from each other.

According to an embodiment, the DDI of the electronic device 601 may read the partial image 60-5 including a digital clock from the GRAM and may enlarge the partial image 60-5. For example, the DDI may enlarge the partial image 60-5 to three times in width/three times in length, based on the resolution of the partial image 60-5. The DDI may output an enlarged partial image 60-5M serving as AOD content onto the display panel, without the intervention of the processor.

According to an embodiment, the partial image 60-5 may further include UI objects (e.g., arrow symbols) linked to mutual different partial images. For example, referring to the enlarged partial image 60-5M, the enlarged partial image 60-5M may include an arrow symbol 61TL linked to the partial image 60-1, an arrow symbol 61T linked to the partial image 60-2, an arrow symbol 61TR lined to the partial image 60-3, an arrow symbol 61L linked to the partial image 60-4, an arrow symbol 61R linked to the partial image 60-6, an arrow symbol 61BL linked to the partial image 60-7, an arrow symbol 61B linked to the partial image 60-8, and an arrow symbol 61BR lined to the partial image 60-9.

According to an embodiment, a user may make a touch 6 on the screen of the electronic device 601 to which the enlarged partial image 60-5M is output. The touch sensor IC of the electronic device 601 may detect the touch 6 by using the touch sensor. The touch sensor IC of the electronic device 601 may determine whether the detected touch 6 corresponds to a touch pattern (an example of the specified touch pattern) representing the selection for the arrow symbol 61TR. The touch sensor IC may provide touch data of the detected touch 6 to the DDI when the detected touch 6 represents the selection for the UI object 61TR. The DDI may select or specify the partial image 60-3 based on the touch data.

For example, the DDI may enlarge the partial image 60-3 to three times in width/three times in length, based on the resolution of the selected partial image 60-3. The DDI may output the enlarged partial image 60-3M as AOD content onto the display panel.

According to an embodiment, the type of the detected touch 6 may be a long press. In this case, the DDI of the electronic device 601 may determine the output duration of the enlarged partial image 60-3M based on the time that the long press is made. For example, when the long press is made for 7 seconds, the DDI may output the enlarged partial image 60-3M during 7 seconds and then may output the enlarged partial image 60-5M again.

According to still another embodiment, the DDI of the electronic device 601 may determine the output time of the enlarged partial image 60-3M based on the pressure value of the touch 6. For example, when the pressure value of the touch 6 exceeds the first threshold value, the DDI may output the enlarged partial image 60-3M for 5 seconds and then may output the enlarged partial image 60-5M again. For another example, when the pressure value of the touch 6 exceeds the second threshold value (second threshold value>first threshold value), the DDI may output the partial image 60-3M for 10 seconds and then may output the partial image 60-5M again.

For another example, when the pressure value of the touch 6 exceeds the first threshold value, the DDI may continuously output the enlarged partial image 60-3M during the time that the pressure value exceeds the first threshold value. The DDI may output the enlarged partial image 60-5M again when the pressure value of the touch 6 decreases to the first threshold or less.

According to an embodiment illustrated in FIG. 6, when the touch of the arrow symbol 61TR may be a long press or a force touch (a touch having a specified pressure or more), an extended user experience may be provided.

Figure 7:
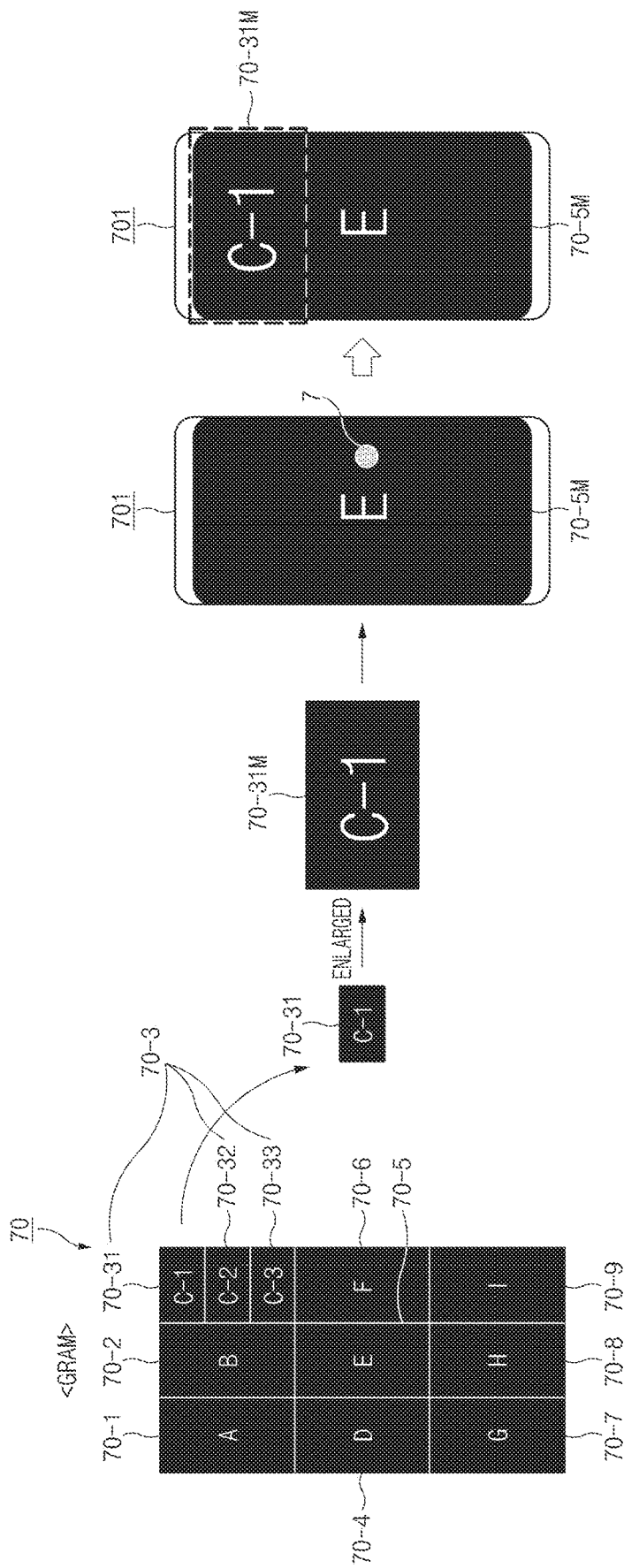
FIG. 7 is a view illustrating an AOD using a sub-partial image, according to an embodiment of the present disclosure.

FIG. 7 is a view illustrating an AOD using a sub-partial image according to an embodiment of the present disclosure.

Referring to FIG. 7, an electronic device 701 and a GRAM of a DDI included in the electronic device 701 are illustrated. A processor of the electronic device 701 may operate in a sleep status and the DDI of the electronic device 701 may perform a Panel Self Refresh operation. In the following description, the parts overlapped with the description made with reference to FIGS. 4 to 6 may be omitted.

According to an embodiment, the GRAM of the DDI may store an image 70. The image 70 may include a partial image A 70-1, a partial image B 70-2, a partial image C 70-3, a partial image D 70-4, a partial image E 70-5, a partial image F 70-6, a partial image G 70-7, a partial image H 70-8, and a partial image I 70-9. Remaining images other than the partial image C 70-3 among the partial images A 70-1 to the partial images I 70-9 may be independent from each other.

According to an embodiment, the partial image C 70-3 may include a first sub-partial image C-1 70-31, a second sub-partial image C-2 70-32, and a third sub-partial image C-3 70-33. The sub-partial images 70-31 to 70-33 may be independent from each other. The DDI may handle the sub-partial images 70-31 to 70-33 identically to the partial images.

According to an embodiment, the DDI of the electronic device 701 may read the partial image E 70-5 of the whole image 70 from the GRAM and may enlarge the partial image E 70-5. For example, the DDI may enlarge the partial image E 70-5 to three times in width/three times in length, based on the partial image E 70-5. The DDI may output an enlarged partial image E 70-5M serving as AOD content onto the display panel, without the intervention of the processor.

According to an embodiment, the user may make a touch 7 on the screen of the electronic device 701 onto which the enlarged partial image E 70-5M is output. The touch sensor IC of the electronic device 701 may detect the touch 7 by using the touch sensor. The touch sensor IC of the electronic device 701 may determine whether the detected touch 7 corresponds to a touch pattern (an example of a specified touch pattern) representing the first sub-partial image C-1 70-31. When the detected touch 7 represents the selection for the touch pattern representing the first sub-partial image C-1 70-31, the touch sensor IC may provide the touch data of the detected touch 7 to the DDI. The DDI may select or specify the partial image C-1 70-31 based on the touch data.

For example, the DDI may enlarge the first sub-partial image C-1 70-31 to three times in width/three times in length, based on the resolution of the selected partial image C-1 70-3. The DDI may output the enlarged first sub-partial image C-1 70-31M serving as AOD content onto the display panel.

According to an embodiment, the DDI may output the enlarged first sub-partial image C-1 70-31M on the enlarged partial image E 70-5M which has been previously displayed such that the first sub-partial image C-1 70-31M is overlapped with the partial image E 70-5M. Accordingly, the enlarged first sub-partial image C-1 70-31M may be overlaid on the enlarged partial image E 70-5M. The DDI may use a hardware compositor (HWC) to output the images 70-31M and 70-5M by combining the images 70-31M and 70-5M with each other.

According to an embodiment illustrated in FIG. 7, differently from FIGS. 4 to 6, two pieces of AOD content may be overlaid with each other without being exchanged with each other and thus may be simultaneously output. Accordingly, the electronic device 601 may provide an extended user experience.

Figure 8:
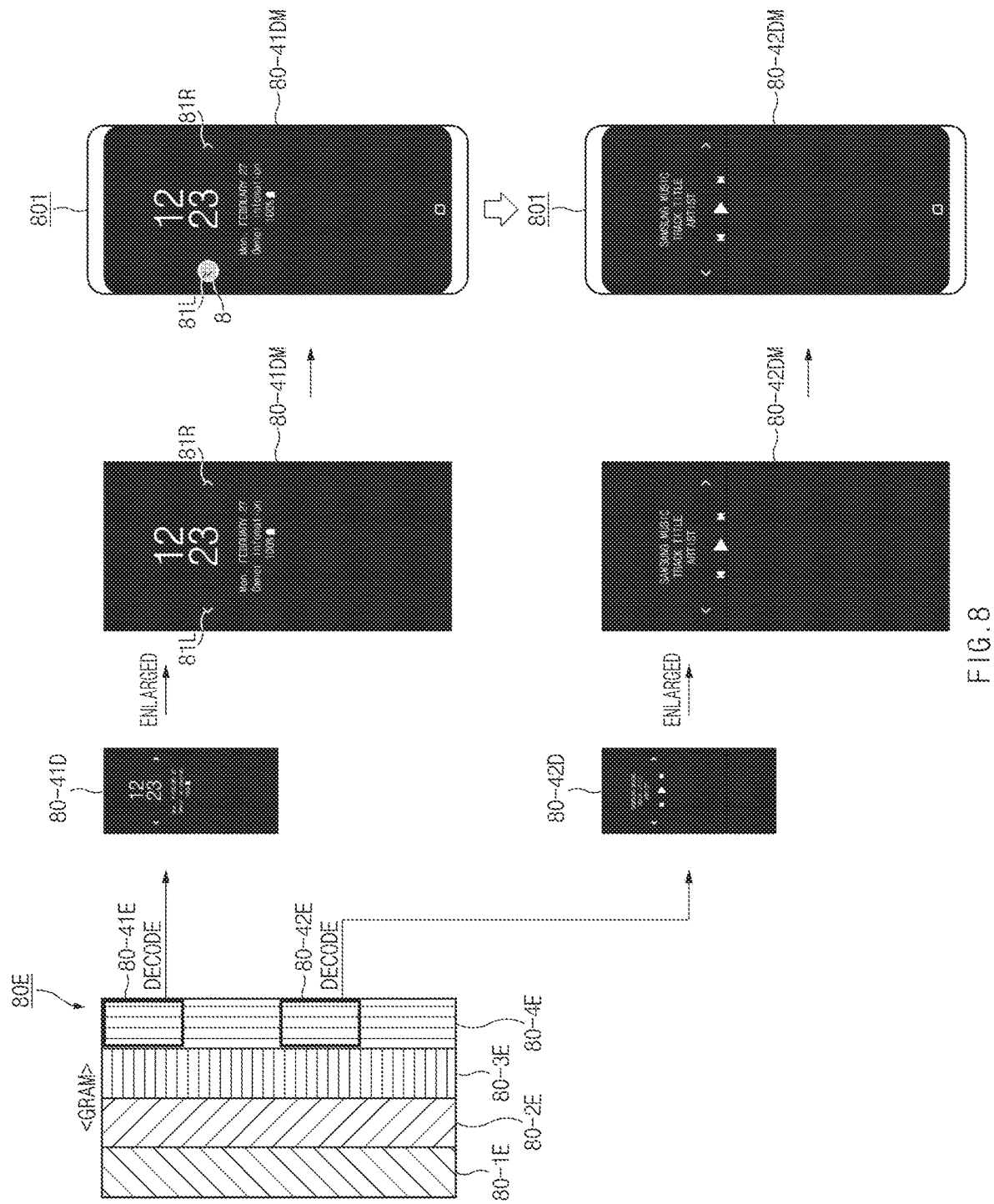
FIG. 8 is a view illustrating an AOD to which a decoder is applied, according to an embodiment of the present disclosure.

FIG. 8 is a view illustrating an AOD to which a decoder is applied, according to an embodiment of the present disclosure.

Referring to FIG. 8, an electronic device 801 and a GRAM of a DDI included in the electronic device 801 are illustrated. The processor of the electronic device 801 may operate in a sleep status. The DDI of the electronic device 801 may perform a Panel Self Refresh operation. In the following description, the parts overlapped with the description made with reference to FIGS. 4 to 7 may be omitted According to an embodiment, the GRAM of the DDI may store an image 80E encoded by the processor. The encoded image 80E may include an encoded first image 80-1E, an encoded second image 80-2E, an encoded third image 80-3E, and an encoded fourth image 80-4E. The encoded images 80-1E to 80-4E may be obtained by encoding a whole image including a plurality of partial images.

According to an embodiment, the DDI of the electronic device 801 may read a part 80-41E of the fourth image 80-4E out of the GRAM. The DDI may decode the part 80-41E without the intervention of the processor and may create the partial image 80-41D including a digital clock.

For example, the DDI may enlarge the partial image 80-41D to two times in width/two times in length, based on the resolution of the partial image 80-41D. The DDI may output the enlarged partial image 80-41DM serving as the AOD content onto the display panel, without the intervention of the processor.

According to an embodiment, the partial image 80-41D may further include an arrow symbol linked to another (encoded) partial image. For example, referring to the enlarged partial image 80-41DM, the enlarged partial image 80-41DM may include an arrow symbol 81L linked to the encoded partial image 80-42E and an arrow symbol 81R linked to another encoded partial image.

According to an embodiment, a user may make a touch 8 on a screen of the electronic device 801 to which the enlarged partial image 80-41DM is output. The touch sensor IC of the electronic device 801 may detect the touch 8 using the touch sensor and may determine whether the detected touch 8 corresponds to a touch pattern (an example of a specified touch pattern) representing the selection for the arrow symbol 81L. The touch sensor IC may provide touch data of the detected touch 8 to the DDI when the detected touch 8 represents the selection for the arrow symbol 81L. The DDI may select or specify the encoded partial image 80-42E based on the touch data.

The DDI may read the encoded partial image 80-42E from the GRAM. The DDI may create a partial image 80-42D including a controller image of a multimedia player by decoding the encoded partial image 80-42E, without the intervention of the processor.

According to an embodiment, the DDI may enlarge the partial image 80-42D to two times in width/two times in length, based on the resolution of the partial image 80-42D. The DDI may output the enlarged partial image 80-42DM serving as AOD content onto the display panel, without the intervention of the processor.

According to an embodiment illustrated in FIG. 8, the GRAM may include four encoded whole images and the total 16 partial images. Therefore, the DDI may provide more various pieces of AOD content to the user without the intervention of the processor. In addition, partial images stored in the GRAM are increased through encoding/decoding, thereby decreasing the number of times that the processor switches to the wake-up status to write an image into the GRAM.

Figure 9:
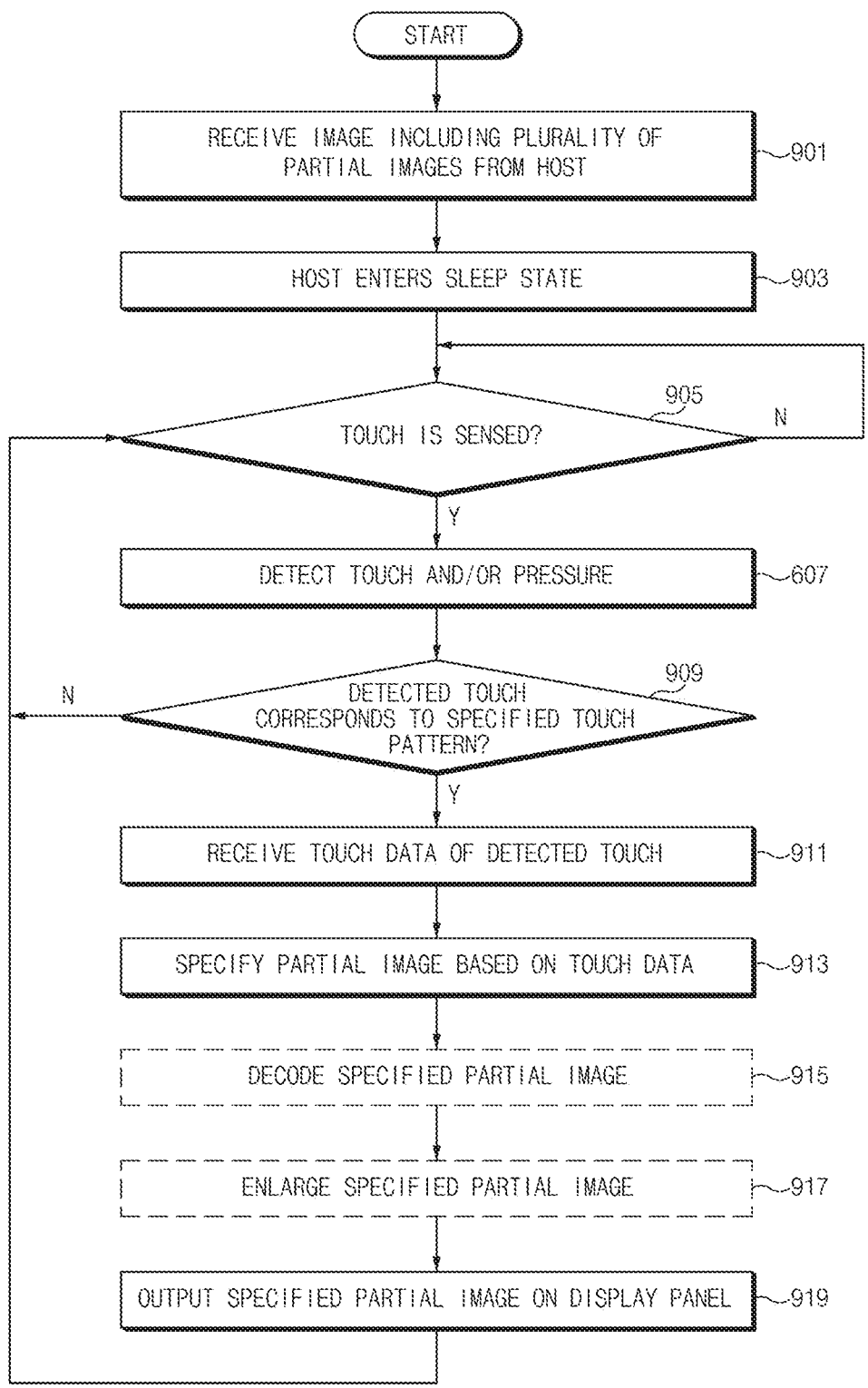
FIG. 9 is a flowchart illustrating a method for driving a display, according to an embodiment of the present disclosure.

FIG. 9 is a flowchart illustrating a method of driving a display, according to an embodiment of the present disclosure.

Referring to FIG. 9, according to an embodiment, the method of driving the display may include operation 901 to operation 919. Operation 901 to operation 919 may be performed by the electronic device 201 illustrated in FIG. 2. Hereinafter, reference numerals of FIG. 2 will be used in the following description on operation 901 to operation 919.

In operation 901, the DDI 215 may receive an image including a plurality of partial images from the host processor 260 (host). The image may be stored in the GRAM 217.

For example, the partial images may be concatenated with each other in terms of a data structure to form an image of one frame. In addition, for example, the aspect ratios of the partial images may correspond to (substantially equal to) an aspect ratio of the whole image including the partial images or may correspond to (substantially equal to) an aspect ratio of the display panel.

In operation 903, the host processor 260 may enter a low power status (sleep status) after storing the image in the GRAM 217. The host processor 260 may maintain the low power status during operations 901 to 919. However, when storing a new image in the GRAM 217 at a specified cycle, or when a physical button is pressed by the user, the host processor 260 may switch to the wake-up status.

According to an embodiment, the host processor 260 may control the DDI 215, the touch sensor IC 225, and the pressure sensor IC 235 to operate under low power, when entering the low power status. For example, the DDI 215 may provide an image signal to the display panel 200p at a lower frequency or may bypass at least some image filters. For another example, to detect the touch under low power, the touch sensor IC 225 may reduce a touch scan frequency of the touch sensor 220, may prolong a response time to recognize the touch, or may bypass a noise filter for processing the touch data.

According to an embodiment, in operation 903, while the host processor 260 is operating under the low power status after entering the low power status, the DDI 215 may selectively output one of a plurality of partial images stored in the GRAM 217 to the display panel 220.

In operation 905, the touch sensor IC 225 may determine whether the touch is sensed by the touch sensor 220. The touch sensor IC 225 may perform operation 907 when the touch is sensed. When the touch is not sensed, the touch sensor IC 225 may repeat operation 905 until the touch is sensed.

In operation 907, the touch sensor IC 225 may detect the touch sensed in operation 905 and may create or calculate the touch data of the touch. For example, the touch data may include at least one of the position (coordinate data (X, Y) of a position that the touch is made) of the touch on the touch sensor 220, the type of the touch, or the duration of the touch. The created touch data may be, for example, stored or written into the register included in the touch sensor IC 225.

According to various embodiments, the touch sensed in operation 905 may have specific pressure. When a pressure value equal to or greater than a specified value is detected by the pressure sensor 230, the pressure sensor IC 235 may detect or calculate the pressure value Z of the touch. For example, the pressure value Z may be stored or written in the register included in the pressure sensor IC 235.

In operation 909, the touch sensor IC 225 may determine whether the touch detected in operation 907 corresponds to the specified touch pattern. For example, the specified touch pattern may be defined based on at least one of the position of the detected touch on the touch sensor 220, the type of the touch (e.g., a single tap, a double tap, a triple tap, a touch swipe, a long press or the like), or the duration of the touch. For example, the specified touch pattern may include a double tap in a region occupied by a specific UI object or a long press made for 2 seconds or more at a specific position (or a region). The touch sensor IC 225 may proceed to operation 911 when the touch detected in operation 907 corresponds to a specified touch pattern. Otherwise, the touch sensor IC 225 may return to operation 905.

In operation 911, the DDI 215 may receive the touch data of the touch, which is detected in operation 907, from the touch sensor IC 225. For example, when the touch detected in operation 907 corresponds to the specified touch pattern, the touch sensor IC 225 may transmit an interrupt to the DDI 215. The DDI 215 may read the touch data of the detected touch out of the register 225 of the touch sensor IC 225 in response to the interrupt.

In operation 913, the DDI 215 may specify or select a partial image based on the touch data received from the touch sensor IC 225. For example, when the DDI 215 receives the touch data from the touch sensor IC 225, the DDI 215 may selectively output the partial image corresponding to the touch data to the display panel 210. While the DDI 215 is outputting the partial image corresponding to the touch data, the low power status of the host processor 260 may be continuously maintained. The DDI 215 may select a partial image previously linked to the touch data.

In operation 915, the DDI 215 may decode a partial image specified in operation 913. Operation 915 may be performed when the image received in operation 901 is encoded. Accordingly, when the image received in operation 901 is not encoded, operation 915 may be omitted.

In operation 917, the DDI 215 may enlarge the partial image (or an image decoded in operation 915) specified in operation 913. According to an embodiment, the DDI 215 may enlarge the partial image specified in operation 913 at a specified magnification based on the resolution of the partial image specified in operation 913 and the resolution of the display panel 210. According to various embodiments, operation 917 may be omitted. In this case, the specified partial image may be displayed on a specified partial region of the display panel 210 (see FIG. 4).

In operation 919, the DDI 215 may output the image to the display panel 210. For example, the image output to the display panel 210 may be the partial image specified in operation 913 or an enlarged image of the partial image.

According to various embodiments of the present disclosure, the touch sensor and/or the pressure sensor may operate in association with that the AOD content is provided. Accordingly, always on touch (AOT) and/or always on force (AOF) may be implemented together with the AOD.

Figure 10:
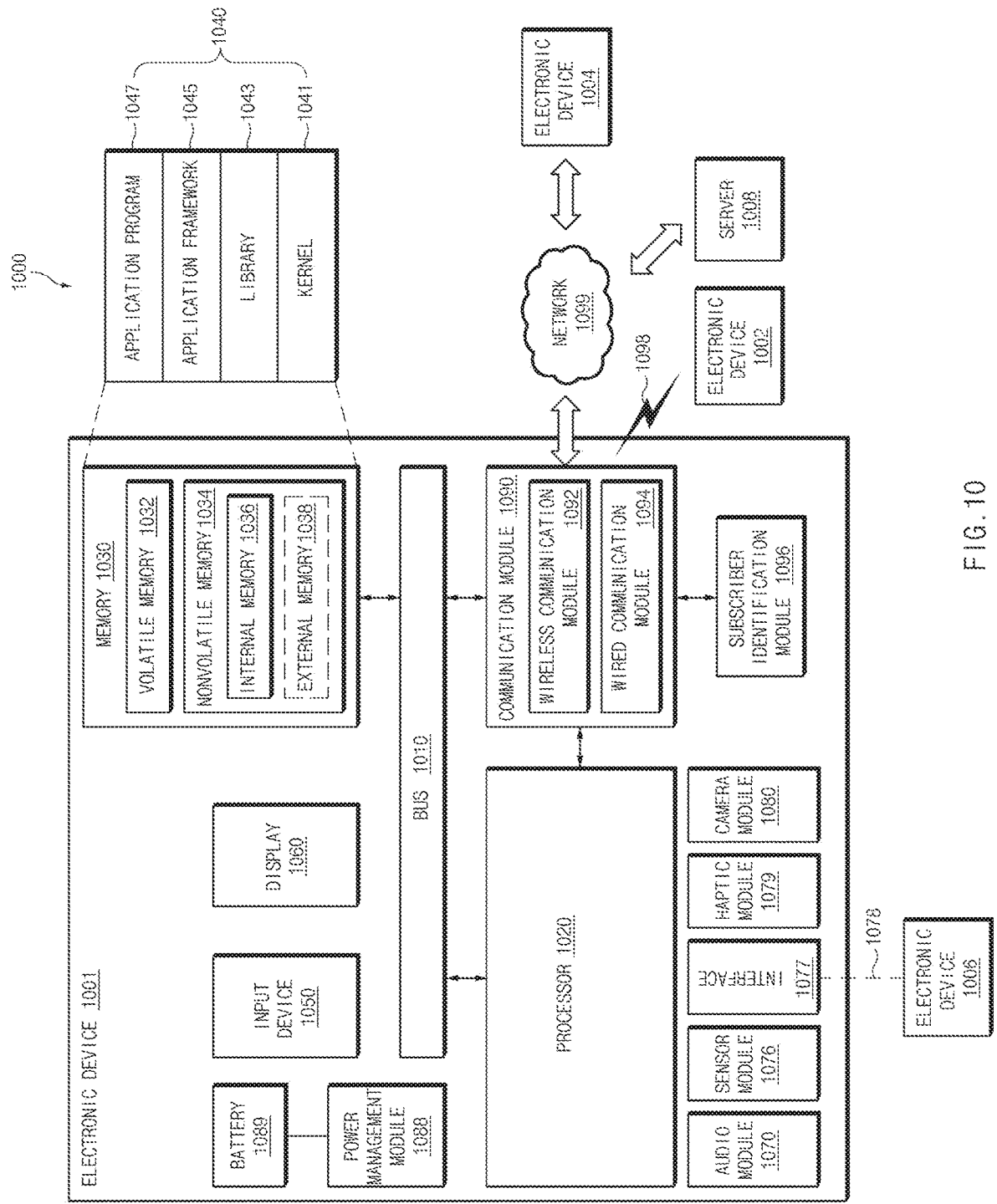
FIG. 10 is a block diagram illustrating an electronic device in a network environment, according to various embodiments of the present disclosure.

FIG. 10 illustrates a block diagram of an electronic device 1001 in a network environment 1000, according to various embodiments.

Referring to FIG. 10, under the network environment 1000, the electronic device 1001 (e.g., the electronic device 201) may communicate with an electronic device 1002 through local wireless communication 1098 or may communication with an electronic device 1004 or a server 1008 through a network 1099. According to an embodiment, the electronic device 1001 may communicate with the electronic device 1004 through the server 1008.

According to an embodiment, the electronic device 1001 may include a bus 1010, a processor 1020 (e.g., the host processor 260), a memory 1030, an input device 1050 (e.g., a micro-phone or a mouse), a display device 1060 (e.g., the display panel 210, the touch sensor 220, the pressure sensor 230), an audio module 1070, a sensor module 1076, an interface 1077, a haptic module 1079, a camera module 1080, a power management module 1088, a battery 1089, a communication module 1090, and a subscriber identification module 1096. According to an embodiment, the electronic device 1001 may not include at least one (e.g., the display device 1060 or the camera module 1080) of the above-described elements or may further include other element(s).

The bus 1010 may interconnect the above-described elements 1020 to 1090 and may include a circuit for conveying signals (e.g., a control message or data) between the above-described elements.

The processor 1020 may include one or more of a CPU, an AP, a GPU, an image signal processor (ISP) of a camera or a communication processor (CP). According to an embodiment, the processor 1020 may be implemented with a system on chip (SoC) or a system in package (SiP). For example, the processor 1020 may drive an operating system (OS) or an application to control at least one of another element (e.g., hardware or software element) connected to the processor 1020 and may process and compute various data. The processor 1020 may load a command or data, which is received from at least one of other elements (e.g., the communication module 1090), into a volatile memory 1032 to process the command or data and may store the result data into a nonvolatile memory 1034.

The memory 1030 may include, for example, the volatile memory 1032 or the nonvolatile memory 1034. The volatile memory 1032 may include, for example, a random access memory (RAM) (e.g., a dynamic RAM (DRAM), a static RAM (SRAM), or a synchronous DRAM (SDRAM)). The nonvolatile memory 1034 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 1034 may be configured in the form of an internal memory 1036 or the form of an external memory 1038 which is available through connection only if necessary, according to the connection with the electronic device 1001. The external memory 1038 may further include a flash drive such as compact flash (CF), secure digital (SD), micro secure digital (Micro-SD), mini secure digital (Mini-SD), extreme digital (xD), a multimedia card (MMC), or a memory stick. The external memory 1038 may be operatively or physically connected with the electronic device 1001 in a wired manner (e.g., a cable or a universal serial bus (USB)) or a wireless (e.g., Bluetooth) manner.

For example, the memory 1030 may store, for example, at least one different software element, such as a command or data associated with the program 1040, of the electronic device 1001. The program 1040 may include, for example, a kernel 1041, a library 1043, an application framework 1045 or an application program (interchangeably, "application") 1047.

The input device 1050 may include a microphone, a mouse, or a keyboard. According to an embodiment, the keyboard may include a keyboard physically connected or a virtual keyboard displayed through the display 1060.

The display 1060 may include a display, a hologram device or a projector, and a control circuit to control a relevant device. The display (e.g., the display panel 210) may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry (e.g., the touch sensor 220), which is able to detect a user's input such as a gesture input, a proximity input, or a hovering input or a pressure sensor (interchangeably, a force sensor) (e.g., the pressure sensor 230) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1001.

The audio module 1070 may convert, for example, from a sound into an electrical signal or from an electrical signal into the sound. According to an embodiment, the audio module 1070 may acquire sound through the input device 1050 (e.g., a microphone) or may output sound through an output device (not illustrated) (e.g., a speaker or a receiver) included in the electronic device 1001, an external electronic device (e.g., the electronic device 1002 (e.g., a wireless speaker or a wireless headphone)) or an electronic device 1006 (e.g., a wired speaker or a wired headphone) connected with the electronic device 1001

The sensor module 1076 may measure or detect, for example, an internal operating status (e.g., power or temperature) of the electronic device 1001 or an external environment status (e.g., an altitude, a humidity, or brightness) to generate an electrical signal or a data value corresponding to the information of the measured status or the detected status. The sensor module 1076 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 1076 may further include a control circuit for controlling at least one or more sensors included therein. According to an embodiment, the sensor module 1076 may be controlled by using the processor 1020 or a processor (e.g., a sensor hub) separate from the processor 1020. In the case that the separate processor (e.g., a sensor hub) is used, while the processor 1020 is in a sleep status, the separate processor may operate without awakening the processor 1020 to control at least a portion of the operation or the status of the sensor module 1076.

According to an embodiment, the interface 1077 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 1078 may physically connect the electronic device 1001 and the electronic device 1006. According to an embodiment, the connector 1078 may include, for example, an USB connector, an SD card/MMC connector, or an audio connector (e.g., a headphone connector).

The haptic module 1079 may convert an electrical signal into mechanical stimulation (e.g., vibration or motion) or into electrical stimulation. For example, the haptic module 1079 may apply tactile or kinesthetic stimulation to a user. The haptic module 1079 may include, for example, a motor, a piezoelectric element, or an electric stimulator.

The camera module 1080 may capture, for example, a still image and a moving picture. According to an embodiment, the camera module 1080 may include at least one lens (e.g., a wide-angle lens and a telephoto lens, or a front lens and a rear lens), an image sensor, an image signal processor, or a flash (e.g., a light emitting diode or a xenon lamp).

The power management module 1088, which is to manage the power of the electronic device 1001, may constitute at least a portion of a power management integrated circuit (PMIC).

The battery 1089 may include a primary cell, a secondary cell, or a fuel cell and may be recharged by an external power source to supply power at least one element of the electronic device 1001.

The communication module 1090 may establish a communication channel between the electronic device 1001 and an external device (e.g., the first external electronic device 1002, the second external electronic device 1004, or the server 1008). The communication module 1090 may support wired communication or wireless communication through the established communication channel. According to an embodiment, the communication module 1090 may include a wireless communication module 1092 or a wired communication module 1094. The communication module 1090 may communicate with the external device through a first network 1098 (e.g. a wireless local area network such as Bluetooth or infrared data association (IrDA)) or a second network 1099 (e.g., a wireless wide area network such as a cellular network) through a relevant module among the wireless communication module 1092 or the wired communication module 1094.

The wireless communication module 1092 may support, for example, cellular communication, local wireless communication, global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), WiFi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 1092 supports cellar communication, the wireless communication module 1092 may, for example, identify or authenticate the electronic device 1001 within a communication network using the subscriber identification module (e.g., a SIM card) 1096. According to an embodiment, the wireless communication module 1092 may include a communication processor (CP) separate from the processor 1020 (e.g., an application processor (AP)). In this case, the communication processor may perform at least a portion of functions associated with at least one of elements 1010 to 1096 of the electronic device 1001 in substitute for the processor 1020 when the processor 1020 is in an inactive (sleep) status, and together with the processor 1020 when the processor 1020 is in an active status. According to an embodiment, the wireless communication module 1092 may include a plurality of communication modules, each supporting only a relevant communication scheme among cellular communication, local wireless communication, or a GNSS communication.

The wired communication module 1094 may include, for example, include a local area network (LAN) service, a power line communication, or a plain old telephone service (POTS).

For example, the first network 1098 may employ, for example, Wi-Fi direct or Bluetooth for transmitting or receiving commands or data through wireless direct connection between the electronic device 1001 and the first external electronic device 1002. The second network 1099 may include a telecommunication network (e.g., a computer network such as a LAN or a WAN, the Internet or a telephone network) for transmitting or receiving commands or data between the electronic device 1001 and the second electronic device 1004.

According to various embodiments, the commands or the data may be transmitted or received between the electronic device 1001 and the second external electronic device 1004 through the server 1008 connected with the second network 1099. Each of the first and second external electronic devices 1002 and 1004 may be a device of which the type is different from or the same as that of the electronic device 1001. According to various embodiments, all or a part of operations that the electronic device 1001 will perform may be executed by another or a plurality of electronic devices (e.g., the electronic devices 1002 and 1004 or the server 1008). According to an embodiment, in the case that the electronic device 1001 executes any function or service automatically or in response to a request, the electronic device 1001 may not perform the function or the service internally, but may alternatively or additionally transmit requests for at least a part of a function associated with the electronic device 1001 to any other device (e.g., the electronic device 1002 or 1004 or the server 1008). The other electronic device (e.g., the electronic device 1002 or 1004 or the server 1008) may execute the requested function or additional function and may transmit the execution result to the electronic device 1001. The electronic device 1001 may provide the requested function or service using the received result or may additionally process the received result to provide the requested function or service. To this end, for example, cloud computing, distributed computing, or client-server computing may be used.

According to an embodiment, an electronic device may include a touch sensor, a touch sensor integrated circuit (IC) which detects a touch through the touch sensor, a display panel, a host processor, and a display driving integrated circuit (IC) which drives the display panel such that an image received from the host processor is displayed on the display panel. The display driving IC may receive an image including a plurality of partial images from the host processor and may store the image in a graphic random access memory (GRAM), and the host processor may be driven to selectively output one of the plurality of partial images in a low power status, and to selectively output, onto the display panel, a partial image corresponding to touch data of the detected touch while maintaining the host processor in the low power status, when the touch data is provided from the touch sensor IC.

According to an embodiment, the host processor may include one of a central processing unit (CPU), a graphic processing unit (GPU), or an application processor (AP).

According to an embodiment, the host processor may be configured to enter a low power status after providing the image to the display driving IC.

According to an embodiment, the plurality of partial images may be concatenated with each other to form one frame image.

According to an embodiment, aspect ratios of the plurality of partial images may correspond to an aspect ratio of the image or an aspect ratio of the display panel.

According to an embodiment, a storage space of the GRAM may correspond to a data size of one frame image of the display panel.

According to an embodiment, a data size of the image stored in the GRAM may correspond to a data size of one frame image of the display panel.

According to an embodiment, the display driving IC may be configured to output, onto the display panel, the partial image corresponding to the touch data by enlarging the partial image corresponding to the touch data at a specified magnification or by adjusting an aspect ratio of the partial image to a specified aspect ratio.

According to an embodiment, the image received from the host processor may include images encoded in a specified scheme, and the GRAM may store at least one of the encoded images. The display driving IC may specify the partial image corresponding to the touch data by selecting some of the encoded images, the selected some of the encoded image may be decoded in a scheme corresponding to the specified scheme, and the decoded result image may be output to the display panel.

According to an embodiment, the electronic device may further include a pressure sensor to sense pressure of the touch, and a pressure sensor IC to detect a pressure value of the sensed pressure. The display driving IC may determine output duration of the partial image corresponding to the touch data based on the detected pressure value.

According to an embodiment, the touch sensor IC may provide the touch data of the detected touch to the display driving IC when the detected touch corresponds to a specified touch pattern, and the specified touch pattern may be specified based on at least one of a position of the touch on the touch sensor, a type of the touch, or duration of the touch.

According to an embodiment, the type of the detected touch may include a single tap, a double tap, a triple tap, a touch swipe, a long press, or a touch gesture.

According to an embodiment, the type of the detected touch may be a long press in which the touch is continuously detected for a specified time. In this case, the display driving IC may output the partial image corresponding to the touch data for a time in which the long press is made.

According to an embodiment, the touch sensor IC may include a register to store the touch data, and the touch sensor IC may transmit a specified interrupt to the display driving IC when the detected touch corresponds to the specified touch pattern. The display driving IC may read the touch data from the register in response to the specified interrupt.

According to an embodiment, the partial images may at least include a first partial image including a first user interface (UI) object, and a second partial image linked to the first UI object. The specified touch pattern may include a first touch pattern representing selection for the first UI object. The display driving IC may output the first partial image onto the display panel. The touch sensor IC may provide the touch data of the detected touch to the display driving IC when the detected touch corresponds to the first touch pattern. The display driving IC may select the second partial image based on the touch data of the detected touch and to output the second partial image onto the display panel.

According to an embodiment, the second partial image may be output in place of the first partial image.

According to an embodiment, the display driving IC may employ a specified image effect when outputting the second partial image.

According to an embodiment, the second partial image may be overlaid on the first partial image.

According to an embodiment, the first partial image may further include a second UI object. Multiple pieces of partial image data may further include a third partial image linked to the second UI object. The specified touch pattern may further include a second touch pattern representing the selection for the second UI object. When the detected touch corresponds to the second touch pattern, the touch data of the detected touch is provided to the display driving IC. The display driving IC may select a third partial image based on the touch data of the detected touch and may output the third partial image to the display panel.

According to an embodiment, the partial images may include at least one of a clock image, a calendar image, a UI object to which a specific operation is allocated, a controller image of a multimedia player, an image of items registered in a planer, a drawing authored by the user, or an abstract of notification.

According to an embodiment, an electronic device may include a touch sensor, a touch sensor IC to detect a touch through the touch sensor, a display panel, and a display driving integrated circuit (IC) which drives the display panel and may include a graphic RAM (GRAM) to store an image received from the host processor. The image may include a plurality of partial images. The touch sensor IC may provide the touch data of the detected touch to the display driving IC when the detected touch corresponds to the specified touch pattern. The display driving IC may specify a partial image based on the touch data and may output the specific partial image to the display panel.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 1030).

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 1030) in the form of a program module. The instruction, when executed by a processor (e.g., a processor 1020), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted or may further include other sub-elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a touch sensor;
   a touch sensor integrated circuit (IC) configured to detect a touch through the touch sensor;
   a display panel; and
   a display driving IC configured to include a graphic random access memory (GRAM) which stores an image received from a host processor, and drive the display panel,
   wherein the image includes a plurality of partial images,
   wherein the touch sensor IC is configured to provide touch data of the detected touch to the display driving IC when the detected touch corresponds to a specified touch pattern, and
   wherein the display driving IC is configured to:
      specify a partial image based on the touch data, and
      output the specific partial image corresponding to the touch data to the display panel, by enlarging the specific partial image at a specified magnification or by adjusting an aspect ratio of the specific partial image to a specified aspect ratio.

2. The electronic device of claim 1, wherein the host processor includes one of a central processing unit (CPU), a graphic processing unit (GPU), or an application processor (AP).

3. The electronic device of claim 1, wherein the host processor is configured to enter the low power status after providing the image to the display driving IC.

4. The electronic device of claim 1, wherein the plurality of partial images are concatenated with each other to form one frame image.

5. The electronic device of claim 1, wherein aspect ratios of the plurality of partial images correspond to an aspect ratio of the image or an aspect ratio of the display panel.

6. The electronic device of claim 1, wherein a storage space of the GRAM corresponds to a data size of one frame image of the display panel.

7. The electronic device of claim 1, wherein a data size of the image stored in the GRAM corresponds to a data size of one frame image of the display panel.

8. The electronic device of claim 1,
wherein the image received from the host processor includes images encoded in a specified scheme,
wherein the GRAM stores at least one encoded image,
wherein the display driving IC specifies the partial image corresponding to the touch data by selecting some of the encoded images,
wherein the selected some of the encoded images are decoded in a scheme corresponding to the specified scheme, and
wherein the decoded result image is output onto the display panel.

9. The electronic device of claim 1, further comprising:
a pressure sensor configured to sense pressure of the touch; and
a pressure sensor IC configured to detect a pressure value of the sensed pressure,
wherein the display driving IC determines output duration of the partial image corresponding to the touch data based on the detected pressure value.

10. The electronic device of claim 1, wherein the specified touch pattern is specified based on at least one of a position of the touch on the touch sensor, a type of the touch, or duration of the touch.

11. The electronic device of claim 10, wherein the type of the detected touch includes a single tap, a double tap, a triple tap, a touch swipe, a long press, or a touch gesture.

12. The electronic device of claim 10,
wherein the type of the detected touch is a long press in which the touch is continuously detected for a specified time or more, and
wherein the display driving IC outputs the partial image corresponding to the touch data for the duration of the long press.

13. The electronic device of claim 10,
wherein the touch sensor IC includes a register configured to store the touch data,
wherein the touch sensor IC transmits a specified interrupt to the display driving IC when the detected touch corresponds to the specified touch pattern, and
wherein the display driving IC is configured to read the touch data from the register in response to the specified interrupt.

14. The electronic device of claim 10, wherein the partial images at least include
a first partial image including a first user interface (UI) object, and
a second partial image linked to the first UI object,
wherein the specified touch pattern includes a first touch pattern representing selection for the first UI object,
wherein the display driving IC outputs the first partial image onto the display panel,
wherein the touch sensor IC provides the touch data of the detected touch to the display driving IC when the detected touch corresponds to the first touch pattern, and
wherein the display driving IC is configured to select the second partial image based on the touch data of the detected touch and to output the second partial image onto the display panel.

* * * * *